(12) United States Patent
Lyubarsky et al.

(10) Patent No.: US 11,454,875 B2
(45) Date of Patent: Sep. 27, 2022

(54) PRISM ARCHITECTURE

(71) Applicant: Texas Instruments Incorporated, Dallas, TX (US)

(72) Inventors: Alexander Lyubarsky, Dallas, TX (US); Michael Terry Davis, Richardson, TX (US); John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/105,072

(22) Filed: Nov. 25, 2020

(65) Prior Publication Data

US 2021/0157225 A1 May 27, 2021

Related U.S. Application Data

(60) Provisional application No. 62/941,276, filed on Nov. 27, 2019.

(51) Int. Cl.
*G03B 33/12* (2006.01)
*G02B 27/14* (2006.01)

(52) U.S. Cl.
CPC ........... *G03B 33/12* (2013.01); *G02B 27/141* (2013.01); *G02B 27/149* (2013.01)

(58) Field of Classification Search
CPC .... G03B 21/008; G03B 21/28; G03B 21/145; G03B 21/208; G03B 21/2013; G03B 21/2033; G03B 21/2053; G03B 33/06; G03B 33/08; G03B 33/12; G02B 27/0172; G02B 27/10; G02B 27/141; G02B 27/142; G02B 27/149; G02B 27/283; G02B 27/0905; G02B 27/1006; G02B 27/1046
See application file for complete search history.

(56) References Cited

U.S. PATENT DOCUMENTS

| | | | |
|---|---|---|---|
| 4,084,180 A | 4/1978 | Stoffels et al. | |
| 2006/0072209 A1* | 4/2006 | Karasawa | H04N 9/3105 359/651 |
| 2009/0296242 A1* | 12/2009 | Callen | G02B 27/0905 359/834 |
| 2013/0100443 A1* | 4/2013 | Li | G02B 5/04 356/317 |
| 2014/0340650 A1* | 11/2014 | Davis | H04N 9/3105 353/33 |
| 2014/0347634 A1* | 11/2014 | Bommerbach | H04N 9/3158 353/31 |
| 2017/0045747 A1* | 2/2017 | Ohmuro | G02B 17/04 |
| 2018/0259839 A1* | 9/2018 | Okuda | G03B 33/08 |
| 2020/0004026 A1* | 1/2020 | Yonekubo | G02B 27/0972 |
| 2020/0012021 A1* | 1/2020 | Fukase | G02B 27/0172 |

* cited by examiner

*Primary Examiner* — Sultan Chowdhury
(74) *Attorney, Agent, or Firm* — Michelle F. Murray; Charles A. Brill; Frank D. Cimino

(57) ABSTRACT

Described examples include a device having a prism cube having a first side and a second side opposite the first side, the prism cube configured to: receive light comprising a first color light and a second color light, direct the first color light to the first side of the prism cube, and direct the second color light to the second side of the prism cube.

18 Claims, 16 Drawing Sheets

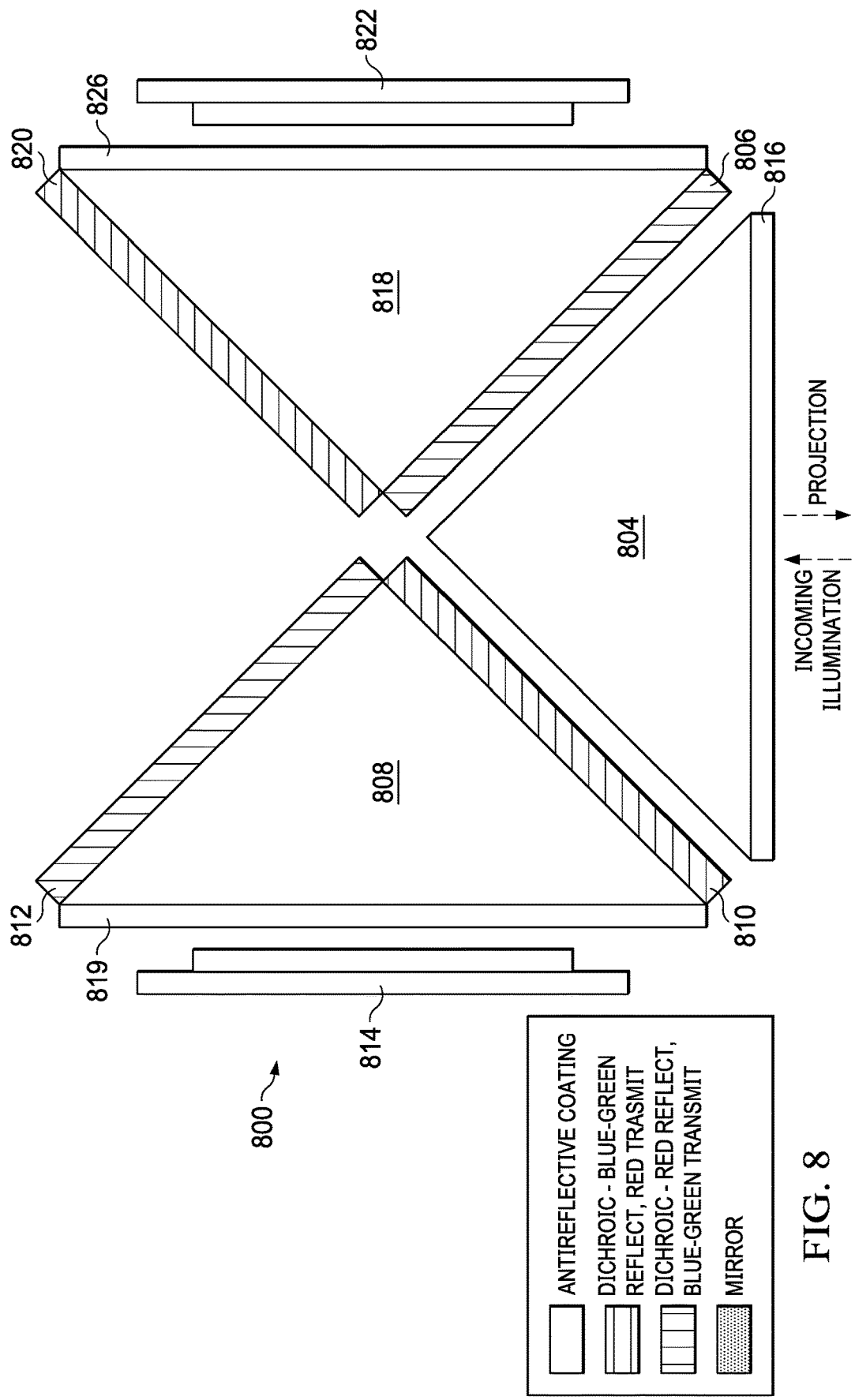

PRISM ARCHITECTURE

CROSS-REFERENCE TO RELATED APPLICATIONS

This application claims the benefit under 35 U.S.C. § 119(e) to co-owned U.S. Provisional Patent Application Ser. No. 62/941,276, filed Nov. 27, 2019, entitled "Dual Chip Projector Prism Architecture," which is hereby incorporated herein by reference in its entirety.

TECHNICAL FIELD

This relates generally to projection devices, and, in more particular examples, to prism architectures.

BACKGROUND

One of the goals of projection system design is to provide as compact an architecture as possible. This allows projectors to be packaged in more aesthetically pleasing packages and facilitates portable applications. Another important goal of reducing size is cost. Larger projection lens systems are disproportionately more expensive than smaller projection lens systems. Larger lenses become disproportionately more expensive to manufacture with requisite clarity. Mechanically, motors and gearing for focus and zoom functions become larger and more expensive to produce. A key measure for reducing lens size is back working distance (BWD). BWD is the distance from the spatial light modulator to the projection lens system. Light from light sources diverges as it propagates away from the light source. In a projection system, light is focused on one or more spatial light modulators. The modulated image is reflected off of or transmitted through the spatial light modulator. As the modulated image propagates from the spatial light modulator, modulated image expands in proportion to the distance from the spatial light modulator to the projection optics (i.e. the BWD). Therefore, it is desirable to minimize the BWD to minimize the size of the projection optics need to handle the modulated image.

SUMMARY

In accordance with an example, a prism architecture includes a first triangular prism having a first face, a second face, third face, and a first apex between the first face and the second face and a second triangular prism having a fourth face, a fifth face, a sixth face, and a second apex between the fourth face and the fifth face, the first apex of the first triangular prism at the second apex of the second triangular prism. The prism architecture also includes a first layer at the second face of the first triangular prism, the first layer reflective of a first color light, a second layer at the fourth face of the second triangular prism, the second layer reflective of the first color light. a third layer at the first face of the first triangular prism, the third layer reflective of a second color light, and a fourth layer at the fifth face of the second triangular prism, the fourth layer reflective of the second color light.

In accordance with another example, a device includes a prism cube having a first side and a second side opposite the first side, the prism cube configured to: receive light comprising a first color light and a second color light, direct the first color light to the first side of the prism cube, and direct the second color light to the second side of the prism cube.

In accordance with another example, a projector includes first spatial light modulator, a second spatial light modulator, and a light source configured to produce light. The projector also includes a prism cube optically coupled to the light source, to the first spatial light modulator, and to the second spatial light modulator, the prism cube configured to: receive the light; the light comprising a first color light and a second color light, direct the first color light to the first spatial light modulator through a first side of the prism cube, and direct the second color light to the second spatial light modulator through a second side of the prism cube, the second side opposite to the first side.

BRIEF DESCRIPTION OF THE DRAWINGS

FIG. 8 is a view of an example prism architecture.

DETAILED DESCRIPTION

Figure 1:
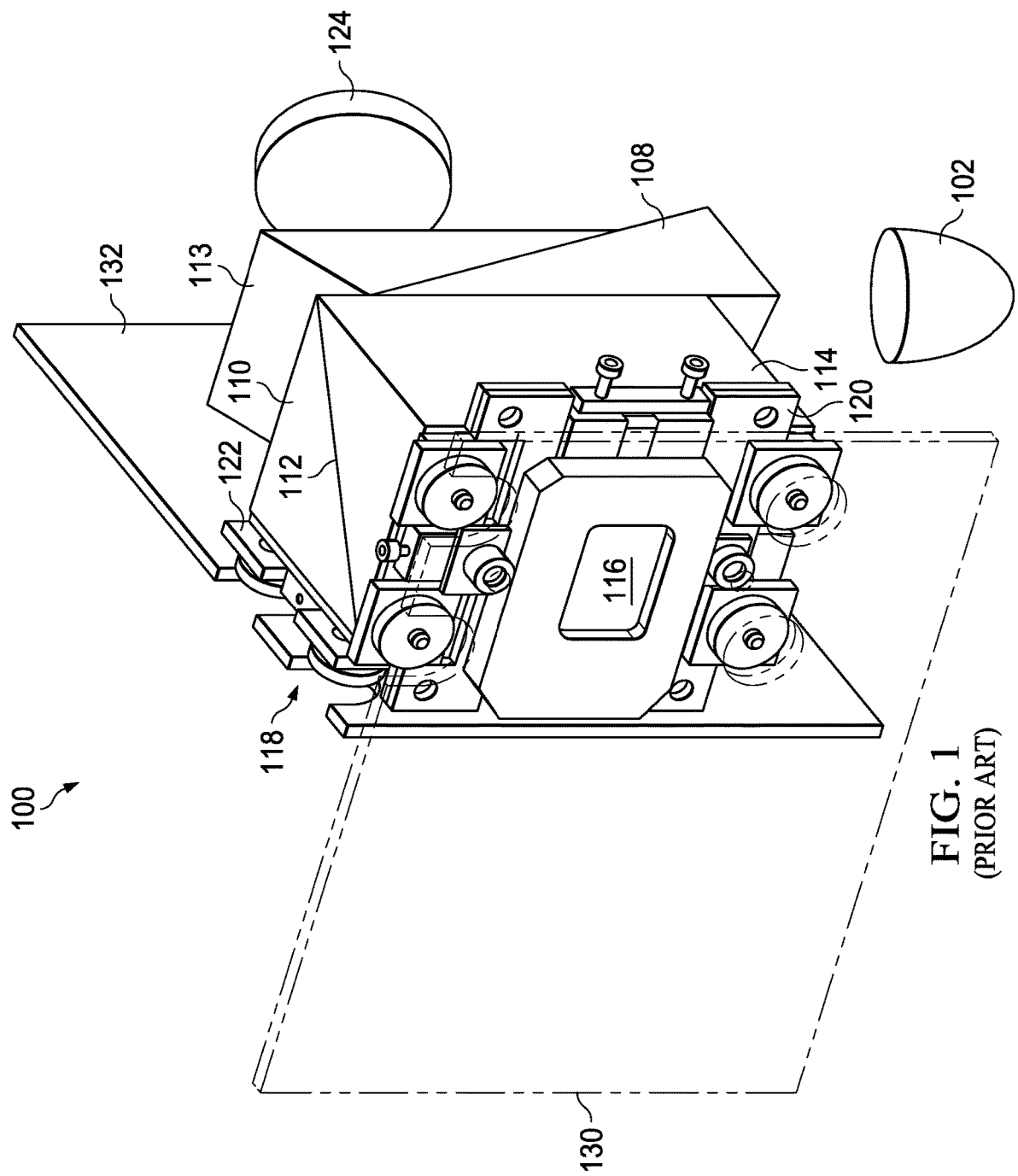
FIG. 1 is a perspective view of an example prism architecture.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled." Elements referred to herein as "optically coupled" are elements that include a connection between the elements that involves transmission of light. Also, as used herein, the terms "on" and "over" may include layers or other elements where intervening or additional elements are between an element and the element that it is "on" or "over." Also, as used herein, the terms "at" and "abutting" indicate that an element is proximate to or in contact with an element that is it "at" or "abutting." Also, as used herein, a "combiner" is a device that combines two or more streams of light into one combined stream of light. Also, as used herein, a "divider" is a device that separates a stream of light stream into two or more streams of light.

FIG. 1 is a perspective view of an example prism architecture 100. Prism architecture 100 is a two-chip architecture. In a two-chip architecture, one spatial light modulator handles two of the primary colors of light. In this example, second spatial light modulator 116 handles alternately blue and green light. Accordingly, light source 102 provides red light and/or alternating green and blue light to total internal reflection (TIR) prims 108, which reflects into first prism 110. Red light passes through first prism 110 and reflects off dichroic layer 112 to first spatial light modulator 118. The light modulated by first spatial light modulator 118 passes through first prism 110, reflects off dichroic layer 112, passes through first prism 110, and through exit prism 113 to projection optics 124. Blue or green light from light source 102 reflects off TIR prism 108, through first prism 110, through dichroic layer 112, through second prism 114 to second spatial light modulator 116. Light modulated by second spatial light modulator 116 passes through second prism 114, dichroic layer 112, first prism 110, exit prism 113 to projection optics 124. Thus, the square or cube prism formed by first prism 110, dichroic layer 112 and second prism 114 serves to divide the light from light source 102 and combine the modulated images from first spatial light modulator 118 and second spatial light modulator 116.

Theoretically, first prism 110 and second prism 114 only need to be large enough to accommodate the width of the image of first spatial light modulator 118 and second spatial light modulator 116, respectively, and the diverging light as reflected from the spatial light modulators. However, first spatial light modulator 118 mounts to first prism 110 using first mount 122 and connects to first circuit board 132. Second spatial light modulator 116 mounts to second prism 114 using second mount 120 and connects to second circuit board 130. Because first spatial light modulator 118 and second spatial light modulator 116 mount on adjacent sides of the square prism architecture that consists of first prism 110 and second prism 114, first prism 110 and second prism 114 must be large enough to avoid physical and electrical interference between first mount 122, second mount 120, first circuit board 132 and second circuit board 130. This additional size increases the back working distance (BWD) of prism architecture 100.

Figure 2A:
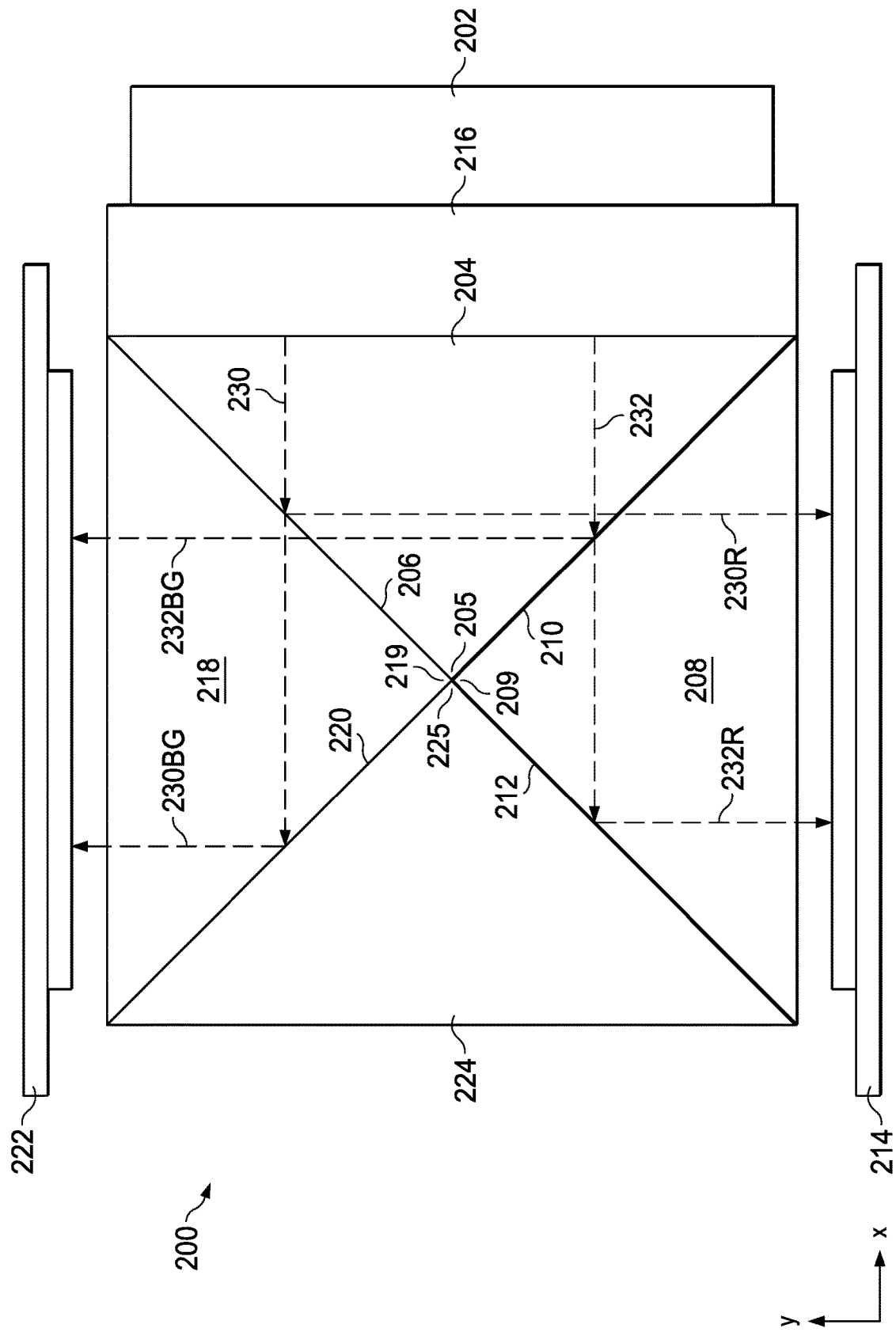
FIGS. 2A and 2B (collectively "FIG. 2") are views of an example prism architecture.
Figure 2B:
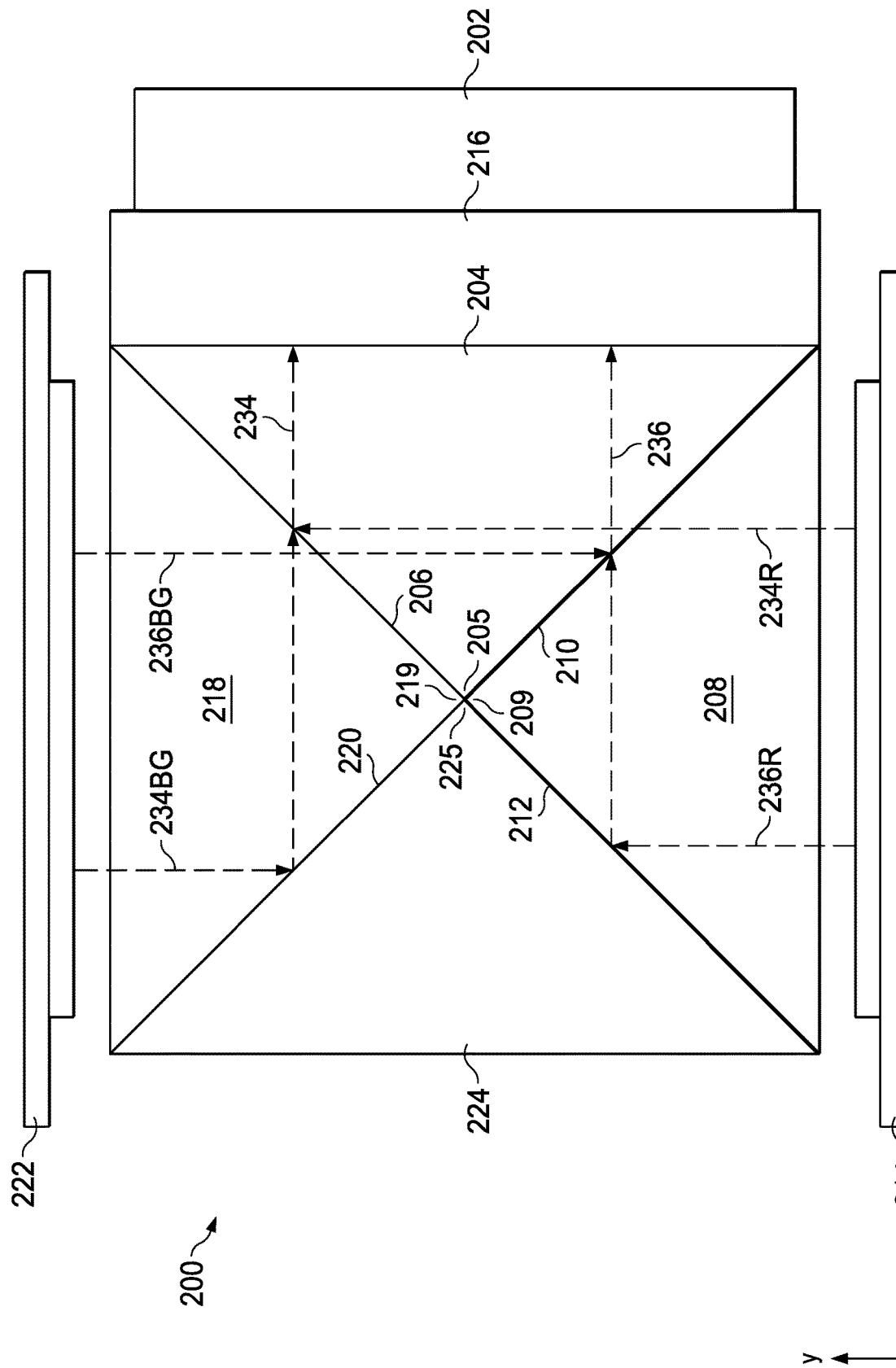

FIGS. 2A and 2B (collectively "FIG. 2") are views of an example prism architecture 200 from the z-axis direction. First prism 204, second prism 208, third prism 218 and fourth prism 224 are triangular prisms. Apex 205 of first prism 204, apex 209 of second prism 208, apex 219 of third prism 218 and apex 225 of fourth prism 224 meet at the center of prism architecture 200. A light source such as light source 601 (FIG. 6) provides red and/or alternating blue and green light into TIR prism 202. The light is shown as first light portion 230 and second light portion 232 in FIG. 2A. First light portion 230 reflects off TIR prism 202 and enters first prism 204. First portion red light 230R reflects off first dichroic layer 206, passes through first prism 204, passes through second dichroic layer 210 and passes through second prism 208 to first spatial light modulator 214. First dichroic layer 206 is a layer that reflects red light and passes green and blue light. A first edge of first dichroic layer 206 is at apex 219 of third prism 218. Second dichroic layer 210 is a layer that reflects green and blue light and passes red light. A second edge of second dichroic layer 210 is at apex 205 of first prism 204. Second light portion 232 reflects off TIR prism 202, passes through first prism 204 to second dichroic layer 210. Second portion red light 232R passes through second dichroic layer 210, passes through second prism 208, reflects of first layer 212, passes through second prism 208 to first spatial light modulator 214. In an example, first layer 212 is a dichroic layer that reflects red light. In another example, first layer 212 is a mirror. Because the light that reflects off first layer 212 has already passed through second dichroic layer 210, second portion blue-green light 232BG has been reflected towards second spatial light modulator 222. Thus, the remaining second portion red light 232R is red light and first layer 212 may be a mirror layer. A third edge of first layer 212 is at apex 209 of second prism 208.

As shown in FIG. 2B, a first portion red modulated light 234R from first spatial light modulator 214 passes through second prism 208, passes through second dichroic layer 210, passes through first prism 204, reflects off first dichroic layer 206 as first portion modulated light 234, passes through first prism 204, and passes through exit prism 216. Second portion red modulated light 236R from first spatial light modulator 214 passes through second prism 208, reflects off first layer 212, passes through second prism 208, passes through second dichroic layer 210 as second portion modulated light 236, passes through first prism 204 and passes through exit prism 216.

As shown in FIG. 2A, second light portion 232 reflects off TIR prism 202 and enters first prism 204. Second portion blue-green light 232BG reflects off second dichroic layer 210, passes through first prism 204, passes through first dichroic layer 206 and passes through third prism 218 to second spatial light modulator 222. First light portion 230 reflects off TIR prism 202, passes through first prism 204 to first dichroic layer 206. First portion blue-green light 230BG passes through first dichroic layer 206, passes through third prism 218, reflects of second layer 220, passes through third prism 218 to second spatial light modulator 222. In an example, second layer 220 is a dichroic layer that reflects green and blue light. In another example, second layer 220 is a mirror. Because first portion blue-green light 230BG that reflects off second layer 220 has already passed through first dichroic layer 206, it already consists of blue and/or green light. Thus, second layer 220 may be a mirror layer. A fourth edge of second layer 220 is at apex 219 of third prism 218. With apex 205 of first prism 204, apex 209 of second prism 208, apex 219 of third prism 218 and apex 225 of fourth prism 224 at the same position, the first edge of first dichroic layer 206, the second edge of second dichroic layer 210, the third edge of first layer 212 and the fourth edge of second layer 220 are abutting.

As shown in FIG. 2B, first portion blue-green modulated light 234BG reflects off second layer 220 and passes through third prism 218, passes through first dichroic layer 206 where it combines with first portion red modulated light 234R to become first portion modulated light 234. First portion modulated light 234 passes through first prism 204 to exit prism 216. Second portion modulated blue-green light 236BG from second spatial light modulator 222 passes through third prism 218, through first dichroic layer 206, reflects off second dichroic layer 210 where it combines with second portion red modulated light 236R to become second portion modulated light 236. Second portion modulated light 236 passes through first prism 204 and passes through exit prism 216. Thus, prism architecture 200 divides the source light by color between first spatial light modulator 214 and second spatial light modulator 222 and then combines the modulated light from first spatial light modulator 214 and second spatial light modulator 222 to create an image for projection. Thus, prism architecture 200 serves as a divider and combiner.

Thus, in the example of FIG. 2, first dichroic layer 206 and first layer 212 combine to direct red light to first spatial light modulator 214 and combine to direct modulated red light to exit prism 216. In practical applications, there may be a slight discontinuity between first dichroic layer 206 and first layer 212. However, because the combination of first dichroic layer 206 and first layer 212 is not at a focal point, this discontinuity does not significantly affect image quality. Also, in the example of FIG. 2, second dichroic layer 210 and second layer 220 combine to direct blue and/or green light to second spatial light modulator 222 and combine to direct modulated green and/or blue light to exit prism 216 where it combines with the modulated red light to produce a completed image for projection. As with first dichroic layer 206 and first layer 212, any slight discontinuity between second dichroic layer 210 and second layer 220 does not significantly affect image quality. Of importance, faces of the second prism 208 and third prism 218 where spatial light modulator 214 and spatial light modulator 222, respectively, are parallel to each other. This configuration significantly mitigates any physical interference between spatial light modulator 214 and spatial light modulator 222 and/or the mounting hardware and driving electronics for spatial light modulator 214 and spatial light modulator 222.

Fourth prism 224 is provided in this example for mechanical stability. Because first spatial light modulator 214 and second spatial light modulator 222 are on opposite sides of prism architecture 200, their mounting systems and circuit boards do not interfere with each other as in example prism architecture 100 (FIG. 1). Thus, first prism 204, second prism 208, third prism 218 and fourth prism 224 can be the minimum size necessary to accommodate the width of first spatial light modulator 214 and second spatial light modulator 222. In this example, first prism 204, second prism 208, third prism 218, and fourth prism 224 are glass. In other examples, first prism 204, second prism 208, third prism 218, and fourth prism 224 are other materials, such as plastic. In other example, the colors of light split into different arrangements of red, green, and blue, or even different color systems, such as cyan, yellow, and magenta. In an example, first spatial light modulator 214 and second spatial light modulator 222 are digital micromirror devices. In other examples, first spatial light modulator 214 and second spatial light modulator 222 are other types of spatial light modulators, such as liquid crystal on silicon (LCoS) devices.

Figure 3:
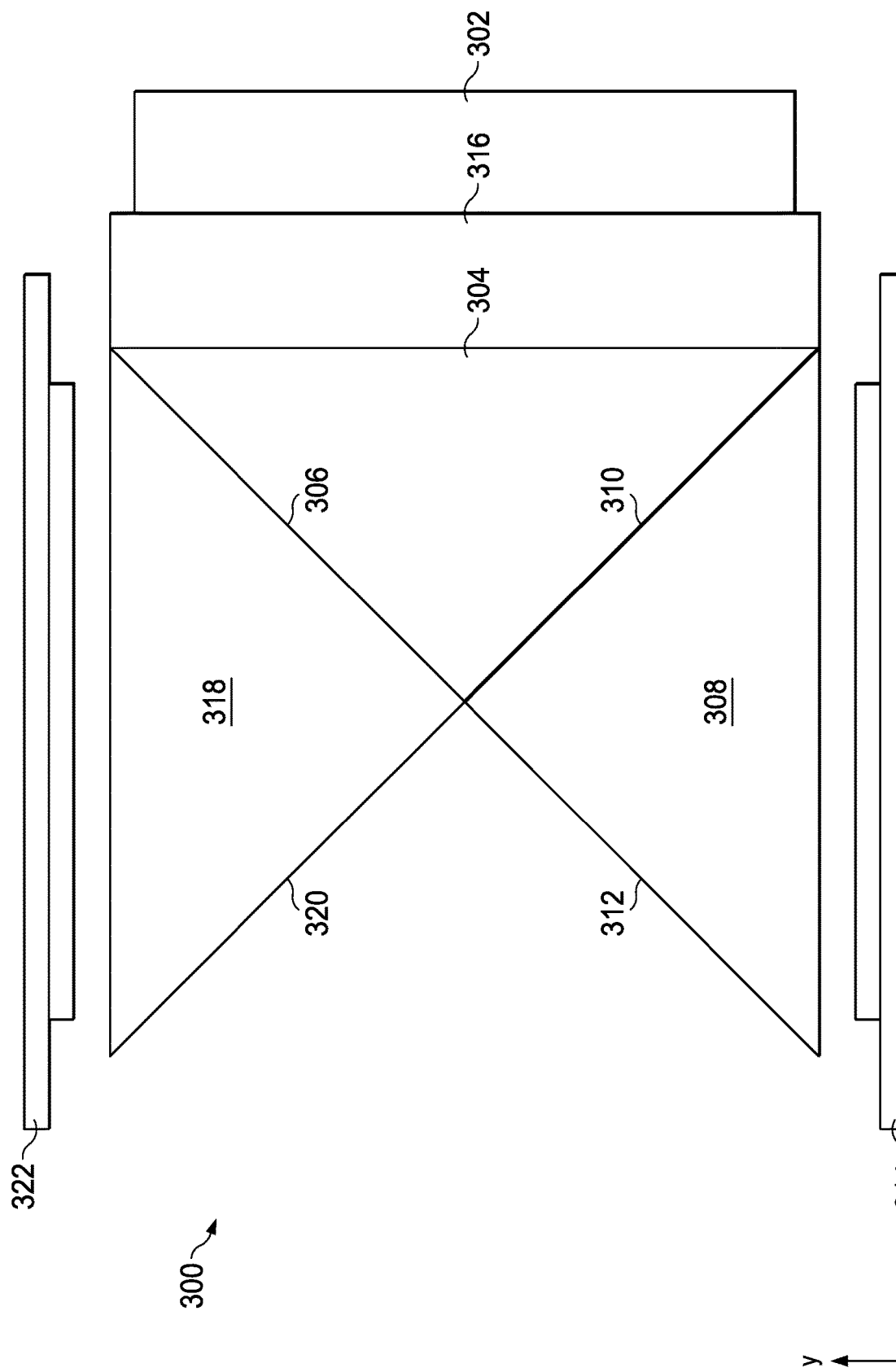
FIG. 3 is a view of another example prism architecture.

FIG. 3 is a view of another example prism architecture 300. TIR prism 302 is an example of TIR prism 202 (FIG. 2). First prism 304 is an example of first prism 204 (FIG. 2). Second prism 308 is an example of second prism 208 (FIG. 2). Third prism 318 is an example of third prism 218 (FIG. 2). First dichroic layer 306 is an example of first dichroic layer 206 (FIG. 2). Second dichroic layer 310 is an example of second dichroic layer 210 (FIG. 2). First layer 312 and second layer 320 are examples of first layer 212 (FIG. 2) and of second layer 220 (FIG. 2), respectively, when these layers are mirrors. However, when these layers are dichroic layers, these layers are not like first layer 212 (FIG. 2) and second layer 220 (FIG. 2) because first layer 312 and second layer 320 do not have prisms on both sides (i.e. are not immersed in glass). When dichroic layers are not immersed in glass, it changes the refractive index of the dichroic layer, which can alter the direction and color of reflections and transmissions of the dichroic layer. Exit prism 316 is an example of exit prism 216 (FIG. 2). First spatial light modulator 314 is an example of first spatial light modulator 214 (FIG. 2). Second spatial light modulator 322 is an example of second spatial light modulator 222 (FIG. 2). Prism architecture 300 operates in the same manner as prism architecture 200 (FIG. 2). Prism architecture 300 omits a fourth prism, such as fourth prism 224 (FIG. 2), but operates in a similar manner as described above with regard to FIG. 2. Omitting the fourth prism may allow for other components such a heat sink, mechanical support, and other mechanisms.

Figure 4:
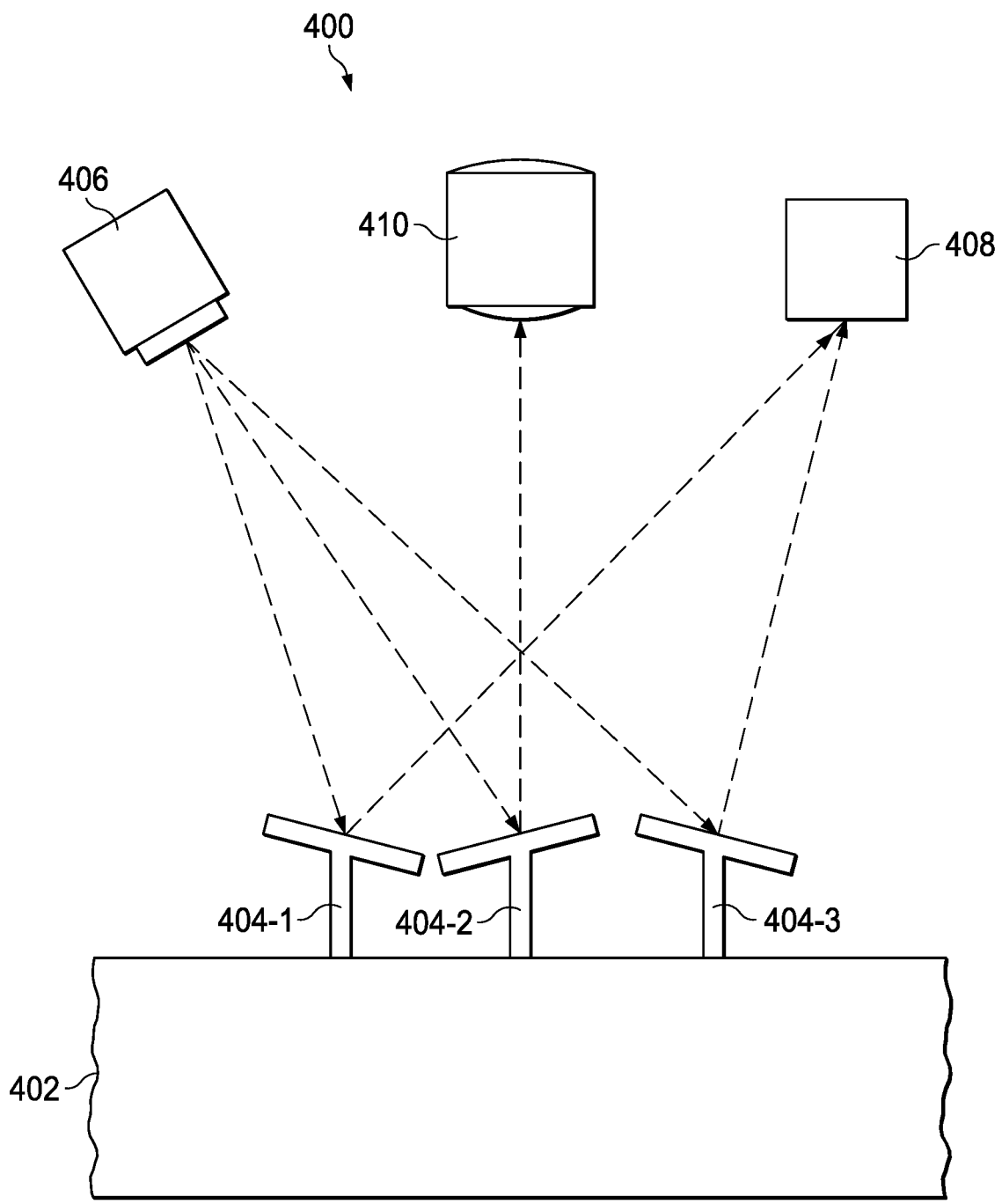
FIG. 4 is a diagram of an example micromirror device.

FIG. 4 is a diagram of an example micromirror device 400. Micromirror 404-1, micromirror 404-2, and micromirror 404-3 are on substrate 402. FIG. 4 only shows three micromirrors for simplicity of explanation. A digital micromirror device (DMD) may have over a million micromirrors. In operation, the micromirrors tilt one way (the "on" position) or another way (the "off" position) depending on the status of image pixel that the micromirror modulates. In the example of FIG. 4, micromirror 404-1 is off, micromirror 404-2 is on, and micromirror 404-3 is off. Because micromirror 404-2 is on, the angle of micromirror 404-2 reflects light from light source 406 to projection optics 410. Because micromirror 404-1 and micromirror 404-3 are off, the angle of micromirror 404-1 and micromirror 404-3 reflects light from light source 406 to light sink 408. Thus, digital micromirror devices selectively illuminate pixels by selectively changing the angle of reflection of a source light.

Figure 5:
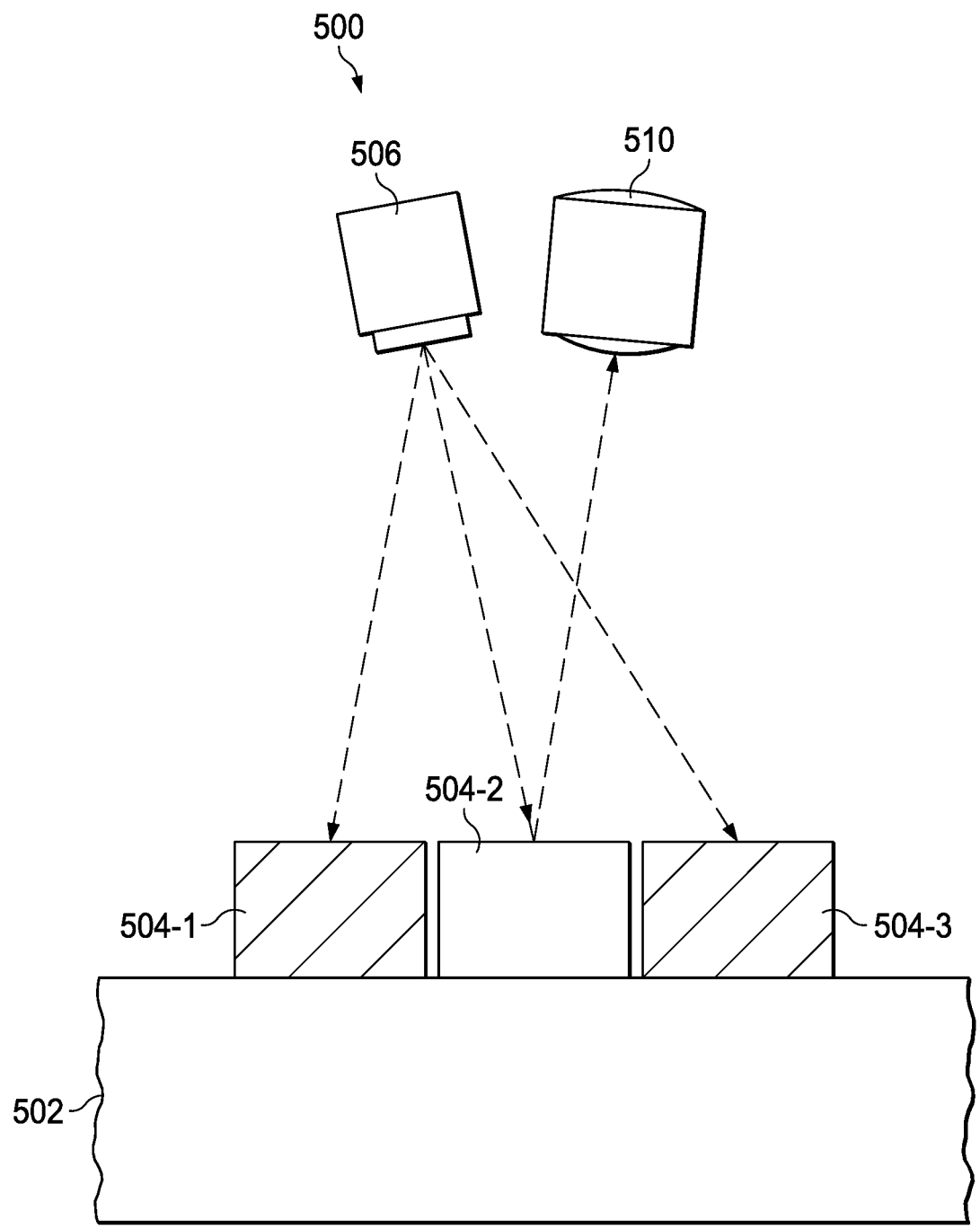
FIG. 5 is a diagram of an example liquid crystal on silicon device.

FIG. 5 is a diagram of an example liquid crystal on silicon device 500. Liquid crystal cell 504-1, liquid crystal cell 504-2, and liquid crystal cell 504-3 are on substrate 502. FIG. 5 only shows three liquid crystal cells for simplicity of explanation. A liquid crystal on silicon (LCoS) device may have over a million liquid crystal cells. In operation, the liquid crystal cells reflect or transmit light (the "on" state) or absorb light way (the "off" state) depending on the status of image pixel that the liquid crystal cell modulates. In the example of FIG. 5, liquid crystal cell 504-1 is off, liquid crystal cell 504-2 is on, and liquid crystal cell 504-3 is off. Because liquid crystal cell 504-2 is on, liquid crystal cell 504-2 reflects light from light source 506 to projection optics 510. Because liquid crystal cell 504-1 and liquid crystal cell 504-3 are off, the light is absorbed. Thus, LCoS devices selectively illuminate pixels by selectively changing the state of the liquid crystal cells.

Figure 6:
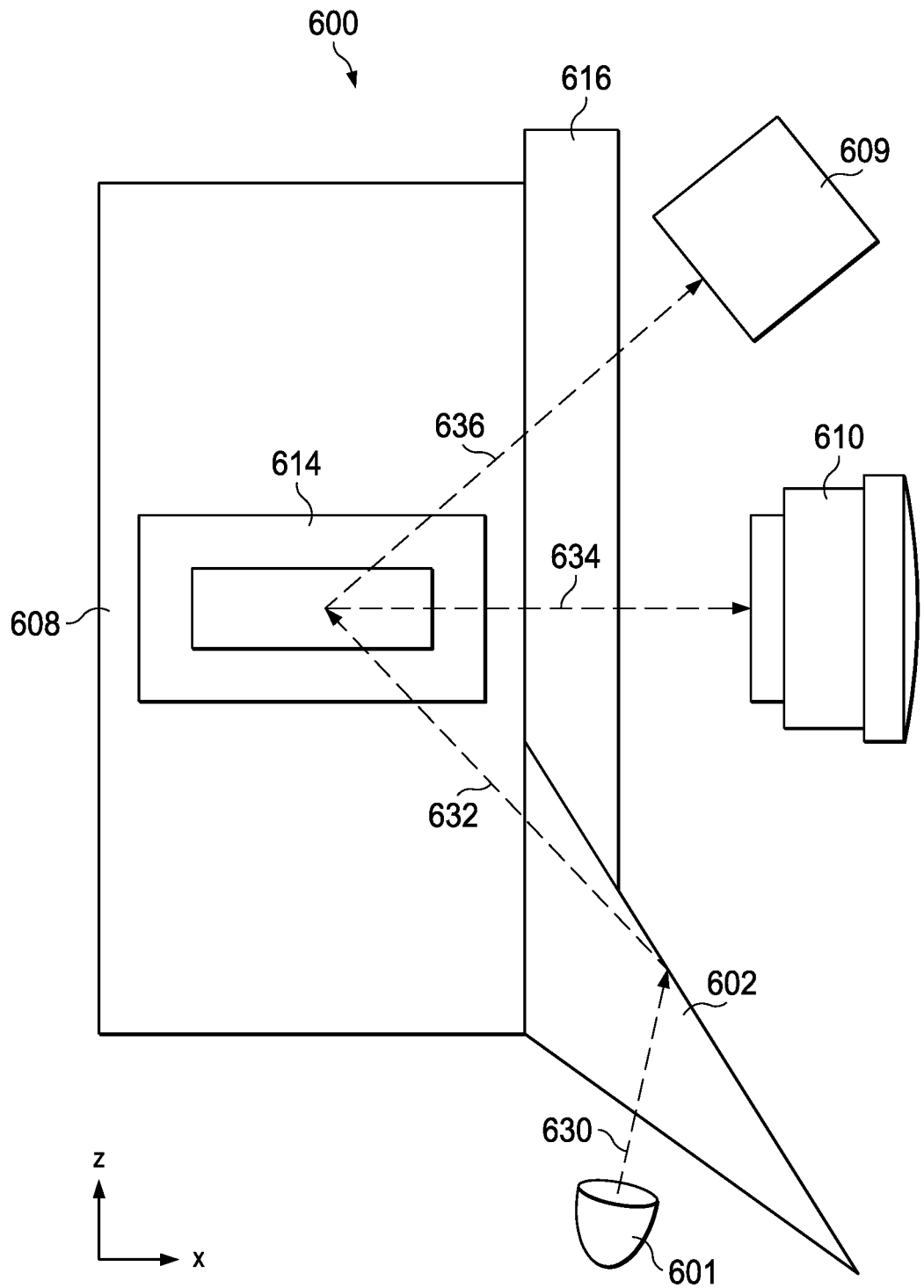
FIG. 6 is view of an example prism architecture.

FIG. 6 is a view of an example prism architecture 600 from the y-axis direction. Prism architecture 600 is an example of prism architecture 200. The view of FIG. 6 is along the y-axis, which is perpendicular to the view of FIG. 2. In this example, light source 601 is a group of lasers or LEDs with each color selectively provided by at least one separate light source. In this example, first dichroic layer 206 (FIG. 2), second dichroic layer 210 (FIG. 2), first layer 212 (FIG. 2), and second layer 220 direct red light from light source 601 to first spatial light modulator 614, which is an example of first spatial light modulator 214 (FIG. 2) and direct blue and green light to second spatial light modulator 222 (FIG. 2). Because second spatial light modulator 222 is handling two colors, at least the blue and green light from light source 601 are provided to spatial light modulator 222 at different times to allow for separate modulation of the two different colors, that alternate sufficiently quickly to be integrated in the viewer's eye. In another example, light source 601 includes a color wheel that filters white light from a white light source. In another example, light source 601 uses a blue light source with a phosphor wheel, or a combination of phosphor (stationary or moving) and a color filter (stationary or moving). In these configurations, light source 601 alternates between providing blue, and green light, and may continuously provide red light or also alternate red light with other colors. One color, such as red, of light 630 reflects of TIR prism 602 as light 632, off a first dichroic layer, such as first dichroic layer 206 (pictured in FIG. 2), and off a first layer, such as first layer 212 (pictured in FIG. 2) to spatial light modulator 614. In this example, spatial light modulator 614 is a digital micromirror device. For pixels in the on state, modulated light 634 from spatial light modulator 614 reflects off the first dichroic layer, such as first dichroic layer 206 (FIG. 2), and off the first layer, such as first layer 212 (FIG. 2), through exit prism 616 to projection optics 610. For pixels in the off state, modulated light 636 from spatial light modulator 614 reflects off the first dichroic layer, such as first dichroic layer 206 (FIG. 2), and off the first layer, such as first layer 212 (FIG. 2), through exit prism 616 to light sink 609. In other configurations, the other prisms are configured so that the off state modulated light exits the same surface. To avoid scattering, unwanted reflections, and refractions in odd directions, the on state light and the off state light should exit on the same flat surface of a prism. If the other prisms are configured so that both on state light and off state light exit prism 204 (FIG. 2), for example, exit prism 616 is not necessary. Other colors, such as blue and/or green, follow the same path, but are modulated by another spatial light modulator, such as spatial light modulator 222 (FIG. 2), which is not visible from the perspective of FIG. 6. In other examples, spatial light modulator 614 and second spatial light modulator 222 (FIG. 2) are liquid crystal on silicon (LCoS) devices. With an LCoS device, the on light reflects at the angle of incidence of the source light and the LCoS device absorbs off light. Therefore, with an LCoS example, the angles of prism architecture 600 are adjusted accordingly.

Figure 7A:
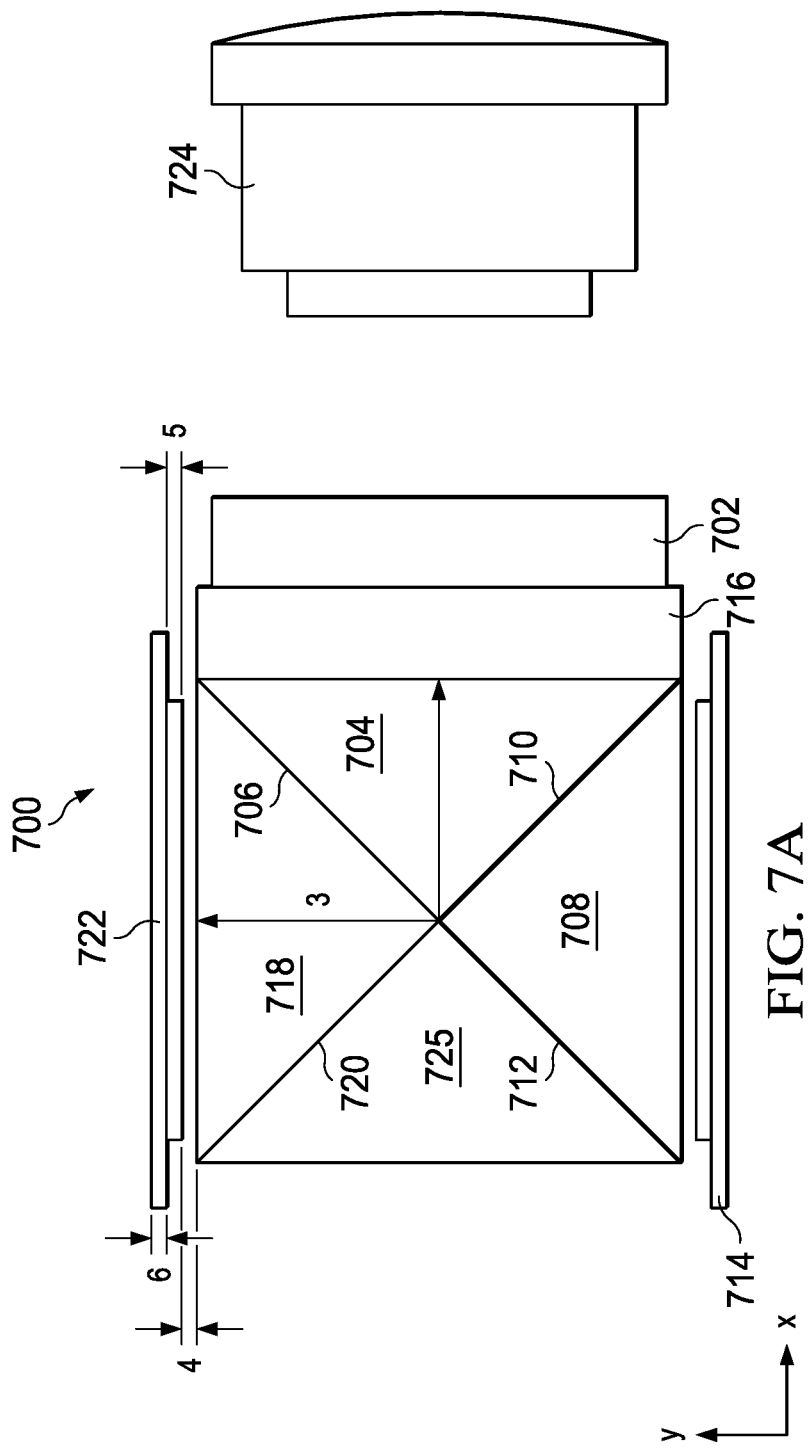
FIGS. 7A and 7B (collectively "FIG. 7") are a z-axis view and a y-axis view, respectively, of another example prism architecture.
Figure 7B:
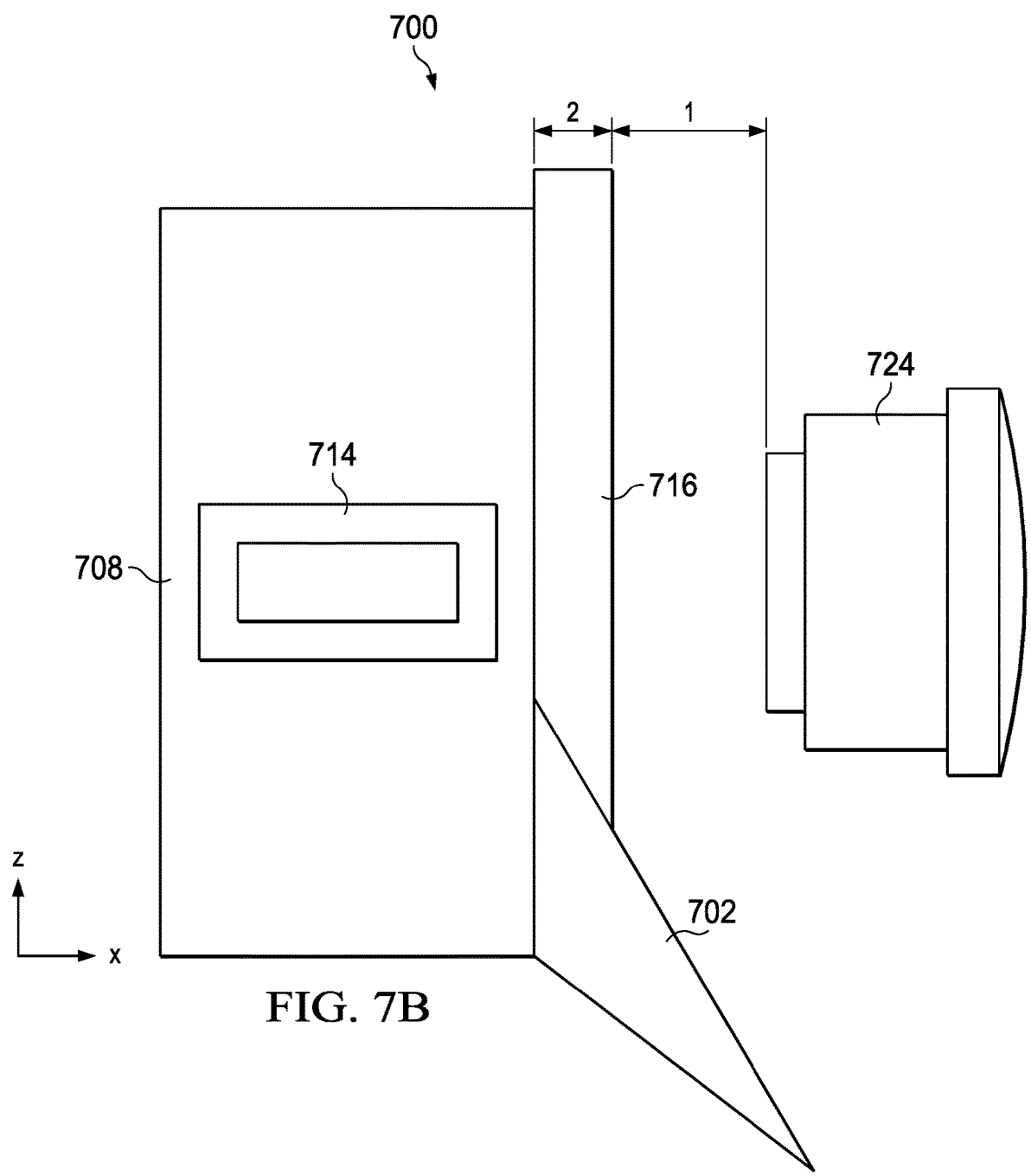

FIGS. 7A and 7B (collectively "FIG. 7") are a z-axis view and a y-axis view, respectively, of another example prism architecture 700. TIR prism 702 is an example of TIR prism 202 (FIG. 2). First prism 704 is an example of first prism 204 (FIG. 2). Second prism 708 is an example of second prism 208 (FIG. 2). Third prism 718 is an example of third prism 218 (FIG. 2). Fourth prism 725 is an example of fourth prism 224 (FIG. 2). First dichroic layer 706 is an example of first dichroic layer 206 (FIG. 2). Second dichroic layer 710 is an example of second dichroic layer 210 (FIG. 2). First layer 712 is an example of first layer 212 (FIG. 2). Second layer 720 is an example of second layer 220 (FIG. 2). First spatial light modulator 714 is an example of first spatial light modulator 214 (FIG. 2). Second spatial light modulator 722 is an example of second spatial light modulator 222 (FIG. 2). Exit prism 716 is an example of exit prism 216 (FIG. 2). Projection optics 724 is an example of projection optics 610 (FIG. 6). Prism architecture 700 operates in a similar manner to prism architecture 200 (FIG. 2). The back working distance (BWD) for prism architecture 700 is the distance that light travels from the spatial light modulator to the projection lens. To determine effective air BWD, for distances within a prism or other material that is not air, the distance is divided by the refractive index of the prism. For the example of FIG. 7 using example material properties, the BWD is summarized in the following chart:

CHART 1

| # | Component | Index of Refraction | Distance (mm) | Adjusted Distance (mm) |
|---|---|---|---|---|
| 1 | Prisms to lens | 1.000 | 3.000 | 3.000 |
| 2 | Exit prism | 1.517 | 8.000 | 5.274 |
| 3 | Cube Prisms | 1.517 | 25.000 | 16.482 |
| 4 | DMD window to prism | 1.000 | 3.000 | 3.000 |
| 5 | DMD window | 1.510 | 1.100 | 0.729 |
| 6 | DMD window to array | 1.000 | 0.702 | 0.702 |
| | | | BWD | 29.187 |

As indicated in FIG. 7, Distance 1 is from the projection optics 724 to exit prism 716. Distance 2 is the thickness of exit prism 716. Distance 3 is the distance of travel within first prism 704 and third prism 718. Distance 4 is the distance from third prism 718 to a protective window of second spatial light modulator 722. Distance 5 is the thickness of the protective window. Distance 6 is the distance from the protective window to the micromirror array within second spatial light modulator 722. As shown in Chart 1, the BWD for the example of FIG. 7 is 29.19 mm. In examples, BWD can range from 25 to 35 mm. This BWD figure is at least 20% smaller than the BWD for other prism based dividers/combiners (that is, prism structures for dividing light into colors for modulation and combining the modulated light), such as prism architecture 100 (FIG. 1). Thus, projection optics 724 can also be at least 20% smaller, depending on the light cone angle from the spatial light modulators, which depends upon the f-number of the source light.

FIG. 8 is a view of an example prism architecture 800. First prism 804 is an example of first prism 304 (FIG. 3). Second prism 808 is an example of second prism 308 (FIG. 3). Third prism 818 is an example of third prism 318 (FIG. 3). First dichroic layer 806 is an example of first dichroic layer 306 (FIG. 3). Second dichroic layer 810 is an example of second dichroic layer 310 (FIG. 3). First layer 812 is an example of first layer 312 (FIG. 3). Second layer 820 is an example of second layer 320 (FIG. 3). First spatial light modulator 814 is an example of first spatial light modulator 314 (FIG. 3). Second spatial light modulator 822 is an example of second spatial light modulator 322 (FIG. 3). The "cube" formed by first prism 804, second prism 808 and third prism 818 is an exploded view with first dichroic layer 806, second dichroic layer 810, first layer 812 and second layer 820 having an exaggerated thickness for clarity. As shown in FIG. 8, first dichroic layer 806 and first layer 812 are dichroic layers that reflect red light and pass blue and green light. First dichroic layer 806 is formed on or adhesively attached to third prism 818. First layer 812 is formed on or adhesively attached to second prism 808. Second dichroic layer 810 and second layer 820 are dichroic layers that reflect blue light, reflect green light, and transmit red light. Second dichroic layer 810 is formed on or adhesively attached to second prism 808. Second layer 820 is formed on or adhesively attached to third prism 818. In addition, antireflective layer 816 is formed on first prism 804, antireflective layer 819 is formed on second prism 808, and antireflective layer 826 is formed on third prism 818. Because first layer 812 and second layer 820 do not have prisms on both sides, the composition of first layer 812 and second layer 820 is modified to match the characteristics of first dichroic layer 806 and second dichroic layer 810, respectively, which have prisms on both sides.

Figure 9:
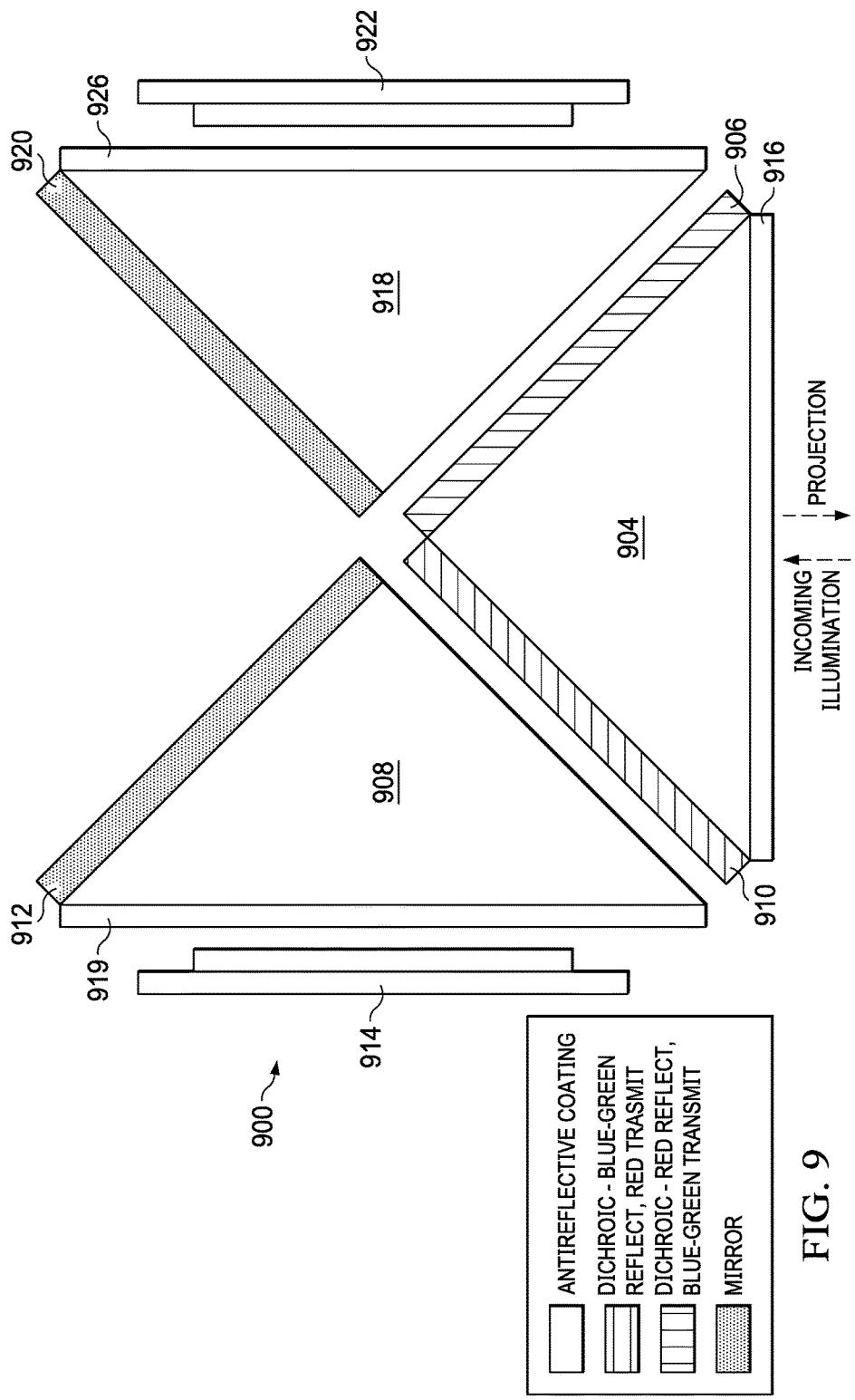
FIG. 9 is a view of an example prism architecture.

FIG. 9 is a view of an example prism architecture 900. First prism 904 is an example of first prism 304 (FIG. 3). Second prism 908 is an example of second prism 308 (FIG. 3). Third prism 918 is an example of third prism 318 (FIG. 3). First dichroic layer 906 is an example of first dichroic layer 306 (FIG. 3). Second dichroic layer 910 is an example of second dichroic layer 310 (FIG. 3). First layer 912 is an example of first layer 312 (FIG. 3). Second layer 920 is an example of second layer 320 (FIG. 3). First spatial light modulator 914 is an example of first spatial light modulator 314 (FIG. 3). Second spatial light modulator 922 is an example of second spatial light modulator 322 (FIG. 3). The "cube" formed by first prism 904, second prism 908 and third prism 918 is an exploded view with first dichroic layer 906, second dichroic layer 910, first layer 912 and second layer 920 having an exaggerated thickness for clarity. As shown in FIG. 9, first dichroic layer 906 is a dichroic layer that reflects red light and passes blue and green light. First dichroic layer 906 is formed on or adhesively attached to first prism 904. First layer 912 is a mirror layer. First layer 912 is formed on or adhesively attached to second prism 908. Second dichroic layer 910 is a dichroic layer that reflects blue and green light and transmit red light. Second dichroic layer 910 is formed on or adhesively attached to first prism 904. Second layer 920 is a mirror layer. Second layer 920 is formed on or adhesively attached to third prism 918. In addition, antireflective layer 916 is formed on first prism 904, antireflective layer 919 is formed on second prism 908, and antireflective layer 926 is formed on third prism 918.

In practice, first prism 904, second prism 908 and third prism 918 are separate components having separate part numbers in the manufacturing process. These prisms are formed into a "cube" using optically clear adhesives during manufacturing. However, because second prism 908 and third prism 918 have the same layers (when one prism is inverted relative to the other), these prisms can be ordered and stored under a single part number, thus simplifying manufacturing.

Figure 10:
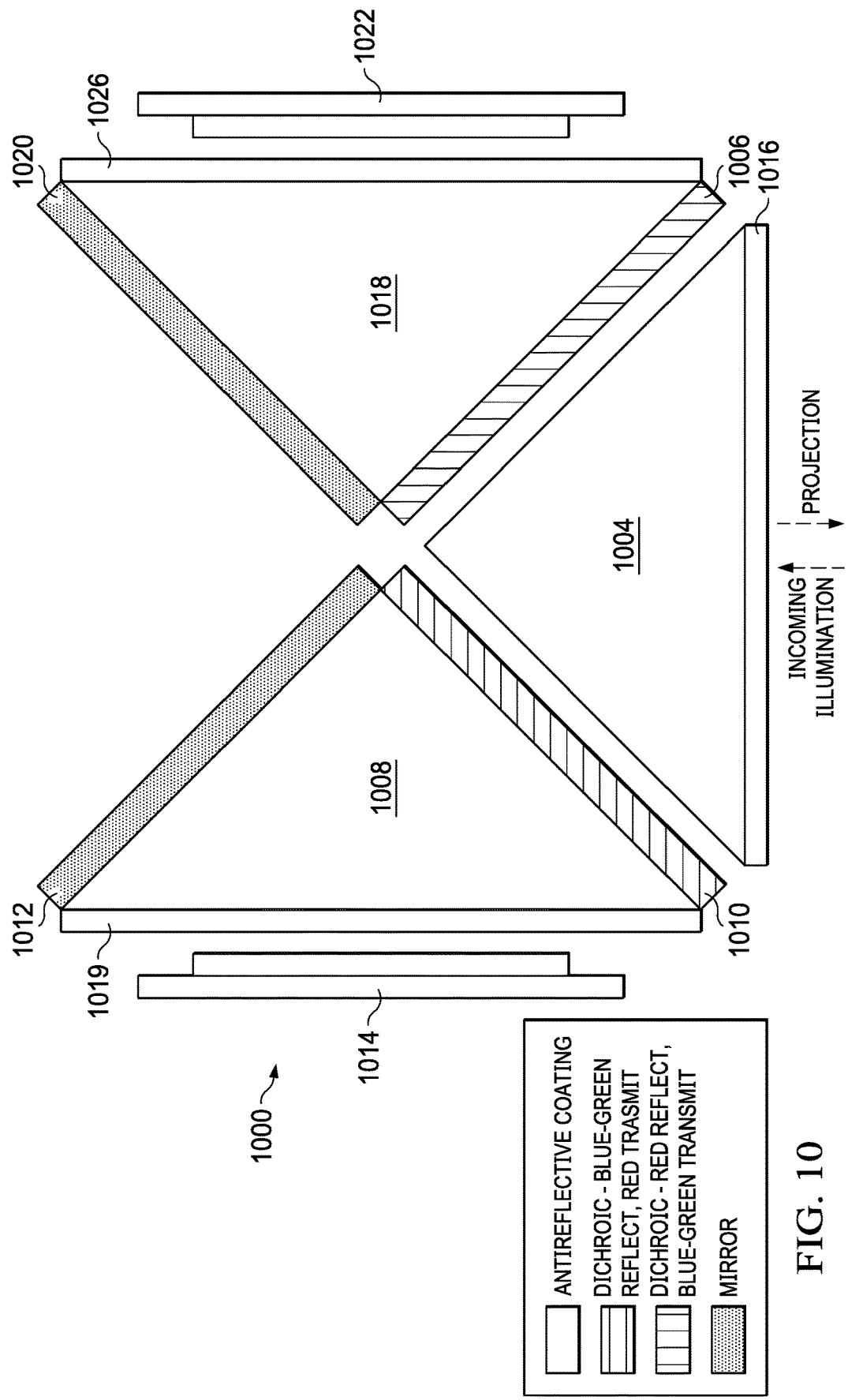
FIG. 10 is a view of an example prism architecture.

FIG. 10 is a view of an example prism architecture 1000. First prism 1004 is an example of first prism 304 (FIG. 3). Second prism 1008 is an example of second prism 308 (FIG. 3). Third prism 1018 is an example of third prism 318 (FIG. 3). First dichroic layer 1006 is an example of first dichroic layer 306 (FIG. 3). Second dichroic layer 1010 is an example of second dichroic layer 310 (FIG. 3). First layer 1012 is an example of first layer 312 (FIG. 3). Second layer 1020 is an example of second layer 320 (FIG. 3). First spatial light modulator 1014 is an example of first spatial light modulator 314 (FIG. 3). Second spatial light modulator 1022 is an example of second spatial light modulator 322 (FIG. 3). The "cube" formed by first prism 1004, second prism 1008 and third prism 1018 is an exploded view with first dichroic layer 1006, second dichroic layer 1010, first layer 1012 and second layer 1020 having an exaggerated thickness for clarity. As shown in FIG. 10, first dichroic layer 1006 is a dichroic layer that reflects red light and passes blue and green light. First dichroic layer 1006 is formed on or adhesively attached to third prism 1018. First layer 1012 is a mirror layer. First layer 1012 is formed on or adhesively attached to second prism 1008. Second dichroic layer 1010 is a dichroic layer that reflects blue and green light and transmit red light. Second dichroic layer 1010 is formed on or adhesively attached to second prism 1008. Second layer 1020 is a mirror layer. Second layer 1020 is formed on or adhesively attached to third prism 1018. In addition, antireflective layer 1016 is formed on first prism 1004, antireflective layer 1019 is formed on second prism 1008, and antireflective layer 1026 is formed on third prism 1018.

In practice, first prism 1004, second prism 1008 and third prism 1018 are separate components having separate part numbers in the manufacturing process. These prisms are formed into a "cube" using optically clear adhesives during manufacturing. However, because second prism 1008 and third prism 1018 have the same layers (when one prism is inverted relative to the other), these prisms can be ordered and stored under a single part number, thus simplifying manufacturing.

Figure 11:
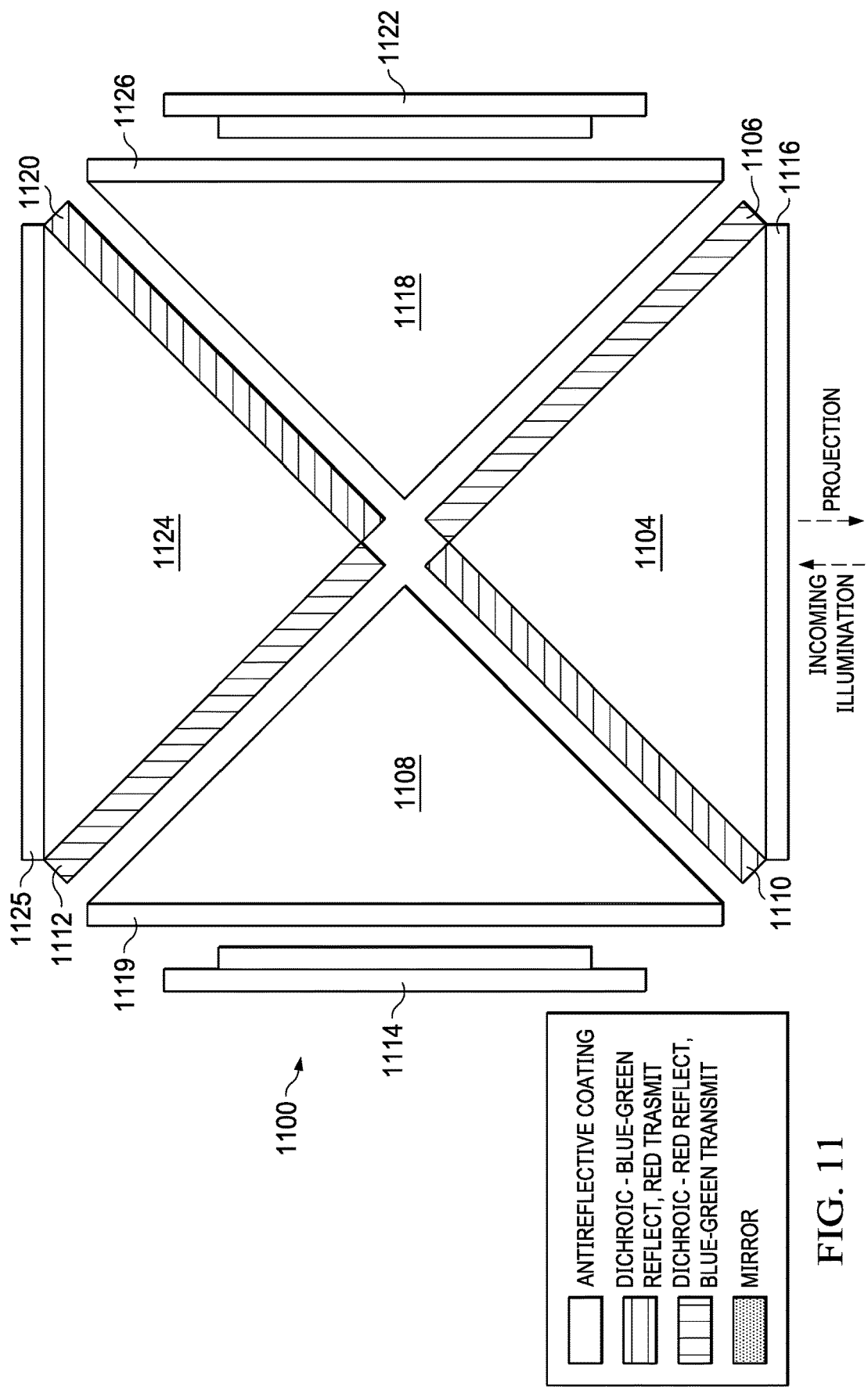
FIG. 11 is a view of an example prism architecture.

FIG. 11 is a view of an example prism architecture 1100. First prism 1104 is an example of first prism 204 (FIG. 2). Second prism 1108 is an example of second prism 208 (FIG. 2). Third prism 1118 is an example of third prism 218 (FIG. 2). Fourth prism 1124 is an example of fourth prism 224 (FIG. 2). First dichroic layer 1106 is an example of first dichroic layer 206 (FIG. 2). Second dichroic layer 1110 is an example of second dichroic layer 210 (FIG. 2). First layer 1112 is an example of first layer 212 (FIG. 2). Second layer 1120 is an example of second layer 220 (FIG. 2). First spatial light modulator 1114 is an example of first spatial light modulator 214 (FIG. 2). Second spatial light modulator 1122 is an example of second spatial light modulator 222 (FIG. 2). The "cube" formed by first prism 1104, second prism 1108, third prism 1118, and fourth prism 1124 is an exploded view with first dichroic layer 1106, second dichroic layer 1110, first layer 1112 and second layer 1120 having an exaggerated thickness for clarity. As shown in FIG. 11, first dichroic layer 1106 is a dichroic layer that reflects red light and passes blue and green light. First dichroic layer 1106 is formed on or adhesively attached to first prism 1104. First layer 1112 is a mirror layer. First layer 1112 is formed on or adhesively attached to fourth prism 1124. Second dichroic layer 1110 is a dichroic layer that reflects blue and green light and transmit red light. Second dichroic layer 1110 is formed on or adhesively attached to first prism 1104. Second layer 1120 is a mirror layer. Second layer 1120 is formed on or adhesively attached to fourth prism 1124. In addition, first antireflective layer 1116 is formed on first prism 1104, second antireflective layer 1119 is formed on second prism 1108, and third antireflective layer 1126 is formed on third prism 1118 and fourth antireflective layer 1125 is formed on fourth prism 1124.

In practice, first prism 1104, second prism 1108, third prism 1118, and fourth prism 1124 are separate components having separate part numbers in the manufacturing process. These prisms are formed into a "cube" using optically clear adhesives during manufacturing. However, because second prism 1108 and third prism 1118 have the same layers, these prisms can be ordered and stored under a single part number, thus simplifying manufacturing. In addition, because first prism 1104 and fourth prism 1124 also have the same layers, these prisms can also be ordered and stored under a single part number, thus simplifying manufacturing.

Figure 12:
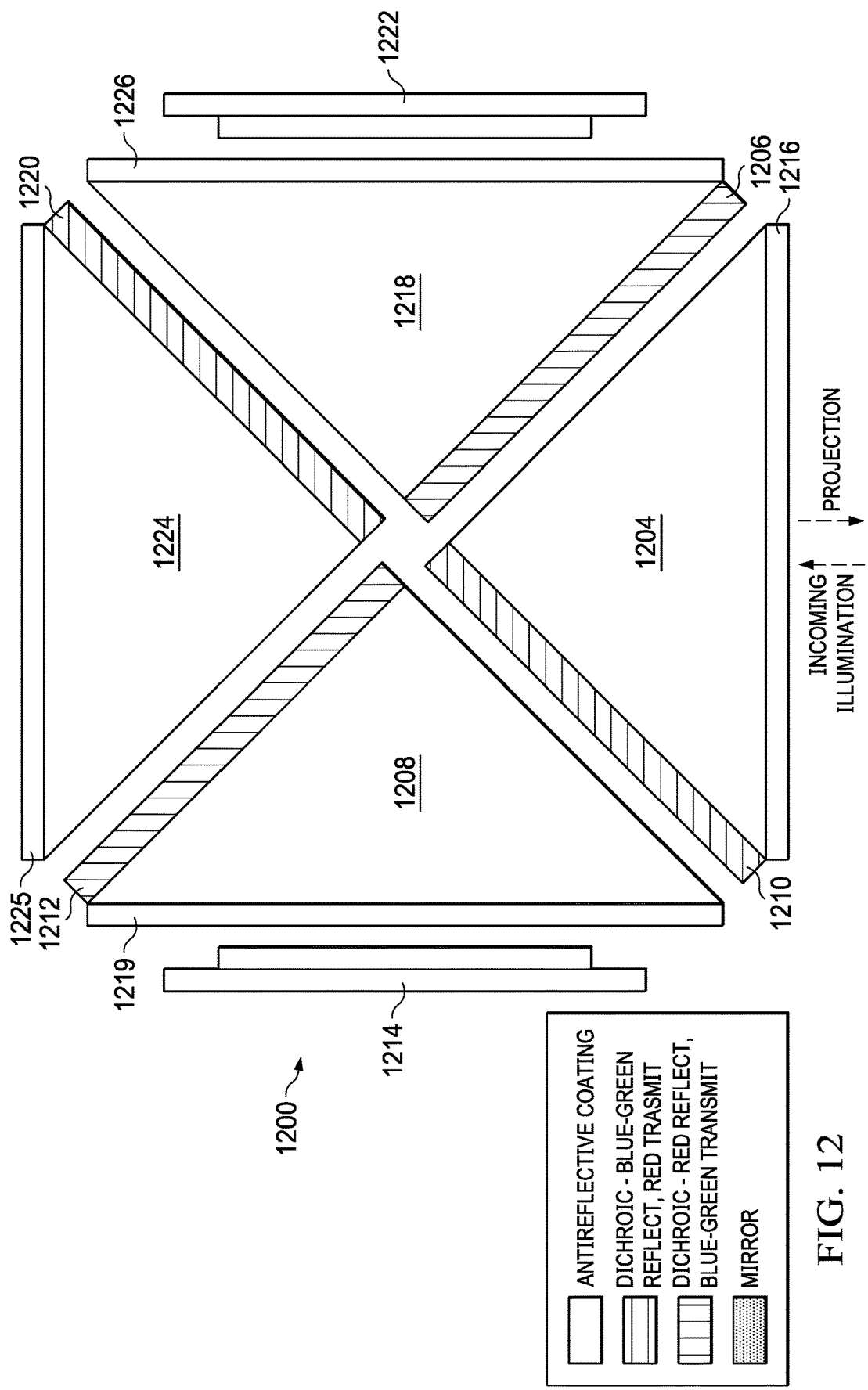
FIG. 12 is a view of an example prism architecture.

FIG. 12 is a view of an example prism architecture 1200. First prism 1204 is an example of first prism 204 (FIG. 2). Second prism 1208 is an example of second prism 208 (FIG. 2). Third prism 1218 is an example of third prism 218 (FIG. 2). Fourth prism 1224 is an example of fourth prism 224 (FIG. 2). First dichroic layer 1206 is an example of first dichroic layer 206 (FIG. 2). Second dichroic layer 1210 is an example of second dichroic layer 210 (FIG. 2). First layer 1212 is an example of first layer 212 (FIG. 2). Second layer 1220 is an example of second layer 220 (FIG. 2). First spatial light modulator 1214 is an example of first spatial light modulator 214 (FIG. 2). Second spatial light modulator 1222 is an example of second spatial light modulator 222 (FIG. 2). The "cube" formed by first prism 1204, second prism 1208, third prism 1218, and fourth prism 1224 is an exploded view with first dichroic layer 1206, second dichroic layer 1210, first layer 1212 and second layer 1220 having an exaggerated thickness for clarity. As shown in FIG. 12, first dichroic layer 1206 is a dichroic layer that reflects red light and passes blue and green light. First dichroic layer 1206 is formed on or adhesively attached to third prism 1218. First layer 1212 is a dichroic layer that reflects red light and passes blue and green light. First layer 1212 is formed on or adhesively attached to fourth prism 1224. Second dichroic layer 1210 is a dichroic layer that reflects blue and green light and transmit red light. Second dichroic layer 1210 is formed on or adhesively attached to first prism 1204. Second layer 1220 is a dichroic layer that reflects blue and green light and transmit red light. Second layer 1220 is formed on or adhesively attached to fourth prism 1224. In addition, first antireflective layer 1216 is formed on first prism 1204, second antireflective layer 1219 is formed on second prism 1208, and third antireflective layer 1226 is formed on third prism 1218 and fourth antireflective layer 1225 is formed on fourth prism 1224.

In practice, first prism 1204, second prism 1208, third prism 1218, and fourth prism 1224 are separate components having separate part numbers in the manufacturing process. These prisms are formed into a "cube" using optically clear adhesives during manufacturing. However, because second prism 1208 and third prism 1218 have the same layers, these prisms can be ordered and stored under a single part number, thus simplifying manufacturing. In addition, because first prism 1204 and fourth prism 1224 also have the same layers, these prisms can also be ordered and stored under a single part number, thus simplifying manufacturing.

Figure 13:
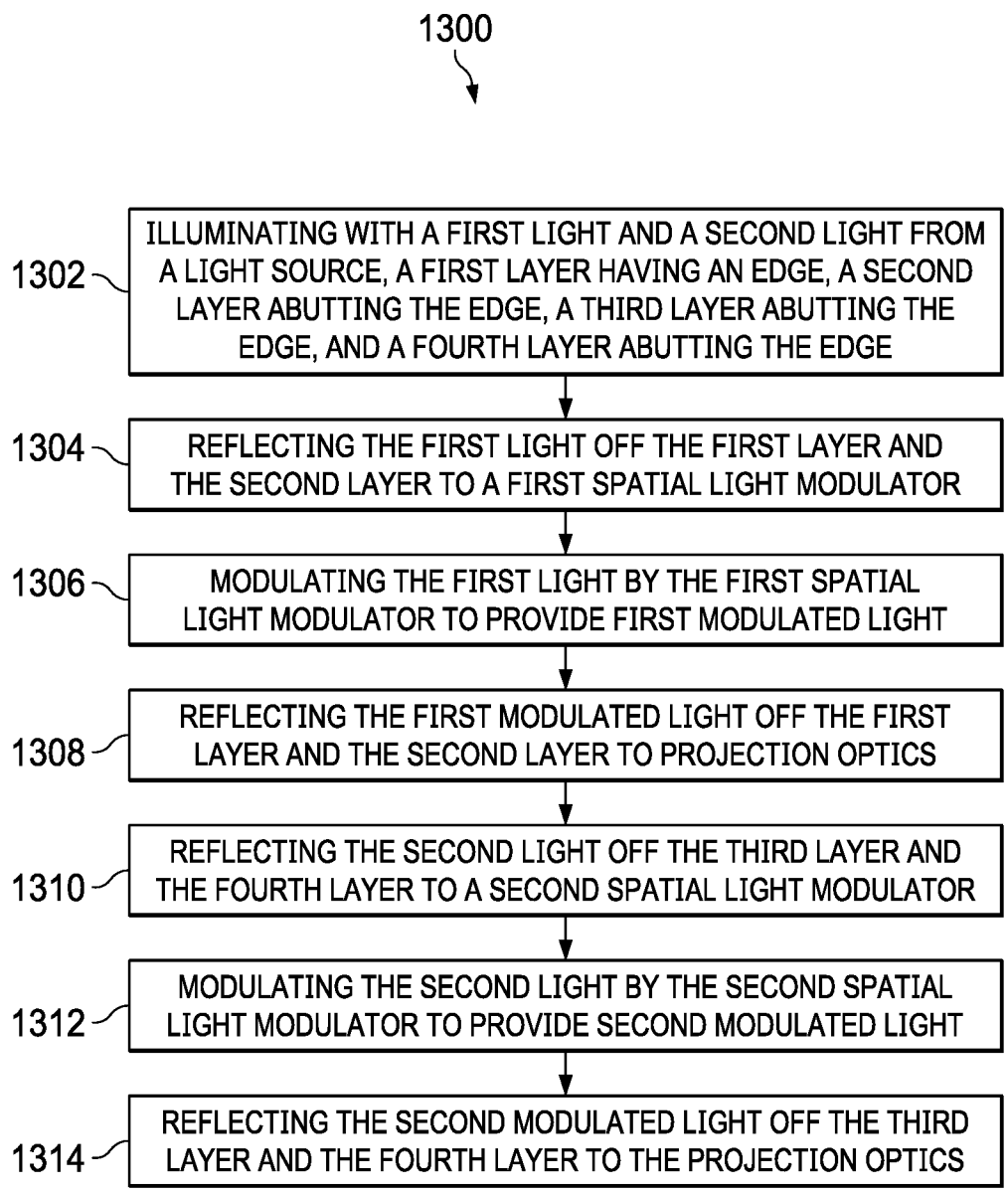
FIG. 13 is a flow diagram of a process.

FIG. 13 is a flow diagram of a process 1300. Step 1302 is illuminating with a first light and a second light from a light source, a first layer having an edge, a second layer abutting the edge, a third layer abutting the edge, and a fourth layer abutting the edge. First portion red light 230R (FIG. 2) and second portion red light 232R (FIG. 2) are examples of the first light. First portion blue-green light 230BG (FIG. 2) and second portion blue-green light 232BG (FIG. 2) are examples of the second light. First dichroic layer 206 (FIG. 2) is an example of the first layer. Second dichroic layer 210 (FIG. 2) is an example of the second layer. First layer 212 (FIG. 2) is an example of the third layer. Second layer 220 (FIG. 2) is an example of the fourth layer. In an example, the first layer and the fourth layer are on a first prism, and the second layer and the third layer are on a second prism. Third prism 218 (FIG. 2) is an example of the first prism and second prism 208 (FIG. 2) is an example of the second prism. Step 1304 is reflecting the first light off the first layer and the second layer to a first spatial light modulator. First spatial light modulator 214 (FIG. 2) is an example of the first spatial light modulator. Step 1306 is modulating the first light by the first spatial light modulator to provide first modulated light. First portion red modulated light 234R (FIG. 2) and second portion red modulated light 236R (FIG. 2) are examples of the first modulated light. Step 1308 is reflecting the first modulated light off the first layer and the second layer to projection optics. Projection optics 610 (FIG. 6) is an example of the projection optics. Step 1310 is reflecting the second light off the third layer and the fourth layer to a second spatial light modulator. Second spatial light modulator 222 (FIG. 2) is an example of the first spatial light modulator. Step 1312 is modulating the second light by the second spatial light modulator to provide second modulated light. First portion blue-green modulated light 234BG (FIG. 2) and second portion blue-green modulated light 236BG (FIG. 2) are examples of the second modulated light. Step 1314 is reflecting the second modulated light off the third layer and the fourth layer to the projection optics.

Figure 14:
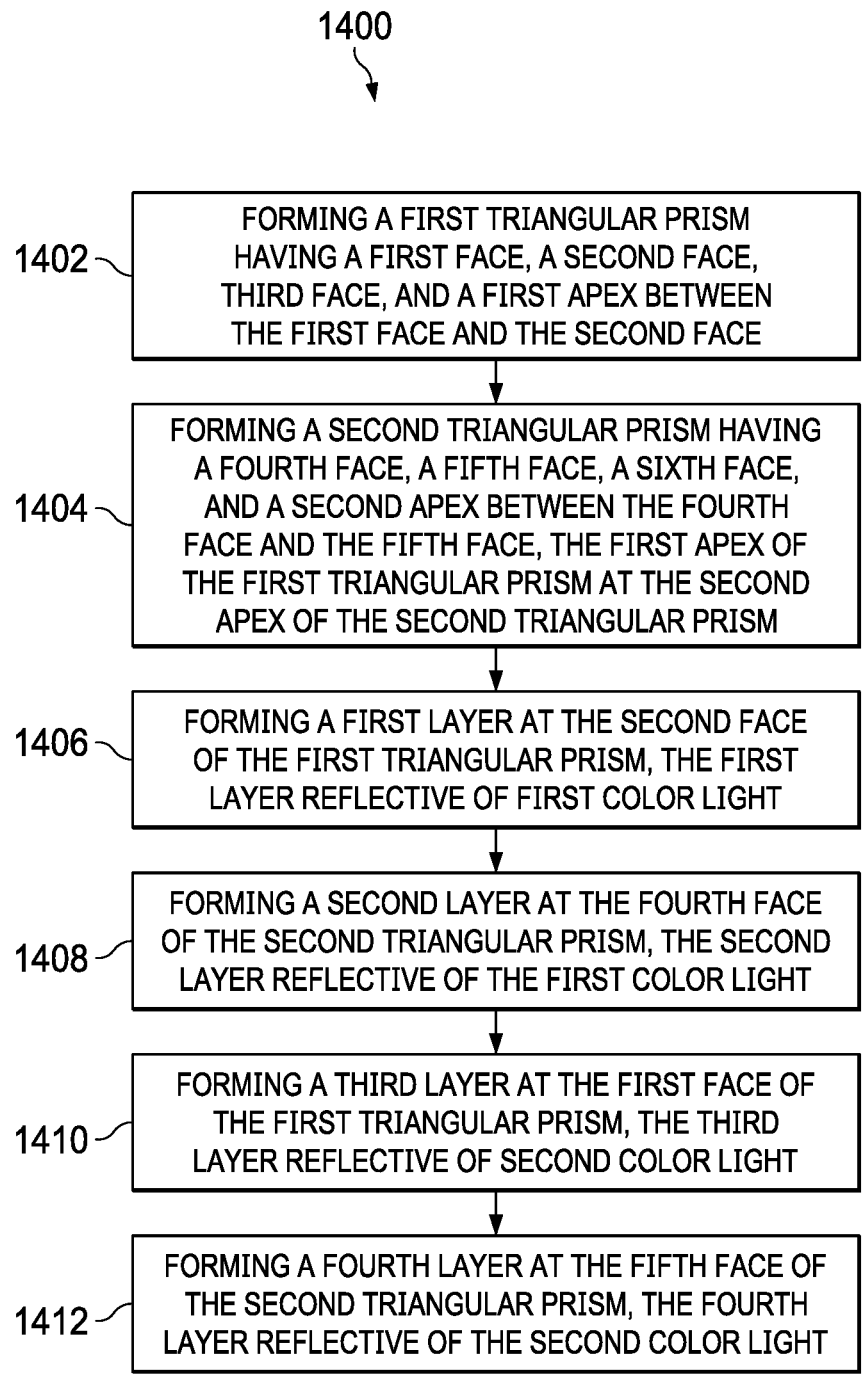
FIG. 14 is a flow diagram of a process.

FIG. 14 is a flow diagram of a process 1400. Step 1402 is forming a first triangular prism having a first face, a second face, third face, and a first apex between the first face and the second face. Third prism 218 (FIG. 2) is an example of the first prism. Step 1404 is forming a second triangular prism having a fourth face, a fifth face, a sixth face, and a second apex between the fourth face and the fifth face, the first apex of the first triangular prism at the second apex of the second triangular prism. Second prism 208 (FIG. 2) is an example of the second prism. Step 1406 is forming a first layer at the second face of the first triangular prism, the first layer reflective of first color light. First dichroic layer 206 (FIG. 2) is an example of the first layer. Step 1408 is forming a second layer at the fourth face of the second triangular prism, the second layer reflective of the first color light. Second dichroic layer 210 (FIG. 2) is an example of the second layer. Step 1410 is forming a third layer at the first face of the first triangular prism, the third layer reflective of second color light. First layer 212 (FIG. 2) is an example of the third layer. Step 1412 is forming a fourth layer at the fifth face of the second triangular prism, the fourth layer reflective of the second color light. Second layer 220 (FIG. 2) is an example of the fourth layer.

Modifications are possible in the described examples, and other examples are possible, within the scope of the claims.

What is claimed is:

1. A prism architecture comprising:
   a first prism;
   a second prism;
   a third prism;
   a first dichroic layer between the first prism and the third prism, the first dichroic layer configured to reflect light having a first color, transmit light having a second color, and transmit light having a third color; and
   a second dichroic layer between the first prism and the second prism, the second dichroic layer configured to transmit light having the first color, reflect light having the second color, and reflect light having the third color.

2. The prism architecture of claim 1, wherein the first prism is a triangular prism having a first apex, the second prism is a triangular prism having a second apex, the third prism is a triangular prism having a third apex, the first apex adjacent the second apex and the third apex.

3. The prism architecture of claim 1, further comprising:
   a first layer on the second prism; and
   a second layer on the third prism.

4. The prism architecture of claim 3, wherein the first layer is a mirror and the second layer is a mirror.

5. The prism architecture of claim 3, wherein the first layer is a dichroic layer and the second layer is a dichroic layer.

6. The prism architecture of claim 3, further comprising a fourth prism, the first layer between the fourth prism and the second prism and the second layer between the fourth prism and the third prism.

7. The prism architecture of claim 1, further comprising:
   a total internal reflection (TIR) prism; and
   an exit prism between the first prism and the TIR prism.

8. A system comprising:
   a first spatial light modulator;
   a second spatial light modulator; and
   a prism architecture having an input output face, the prism architecture optically coupled to the first spatial light modulator and to the second spatial light modulator, the prism architecture configured to:
      receive input light having a first color, a second color, and a third color at the input output face;
      direct a first portion of the input light having the first color towards the first spatial light modulator;
      direct a second portion of the input light having the second color towards the second spatial light modulator; and
      direct a third portion of the input light having the third color towards the second spatial light modulator;
   wherein the first spatial light modulator is configured to modulate the first portion of the input light to produce first modulated light having the first color;
   wherein the second spatial light modulator is configured to:
      modulate the second portion of the input light to produce second modulated light having the second color; and modulate the third portion of the input light to produce third modulated light having the third color; and wherein the prism architecture is further configured to:
   direct the first modulated light towards the input output face;
   direct the second modulated light towards the input output face; and
   direct the third modulated light towards the input output face.

9. The system of claim 8, wherein:
the prism architecture is configured to:
   direct the first modulated light towards projection optics;
   direct the second modulated light towards the projection optics; and
   direct the third modulated light towards the projection optics.

10. The system of claim 8, further comprising a light source configured to:
   produce the first portion of the input light having the first color;
   produce the second portion of the input light having the second color during a first time period; and
   produce the third portion of the input light having the third color during a second time period.

11. The system of claim 8, wherein the prism architecture comprises:
   a first prism;
   a second prism facing the first spatial light modulator;
   a third prism facing the second spatial light modulator;
   a first dichroic layer between the first prism and the third prism; and
   a second dichroic layer between the first prism and the second prism.

12. A system comprising:
   a first spatial light modulator;
   a second spatial light modulator; and
   a prism architecture comprising:
      a first prism;
      a second prism facing the first spatial light modulator;
      a third prism facing the second spatial light modulator;
      a first dichroic layer between the first prism and the third prism, the first dichroic layer configured to reflect light having a first color, transmit light having a second color, and transmit light having a third color; and
      a second dichroic layer between the first prism and the second prism, the second dichroic layer configured to transmit light having the first color, reflect light having the second color, and reflect light having the third color.

13. The system of claim 12, further comprising:
   a light source optically coupled to the first prism; and
   projection optics optically coupled to the first prism.

14. The system of claim 12, wherein the prism architecture is configured to:
   receive input light having the first color, the second color, and the third color;
   direct a first portion of the input light having the first color towards the first spatial light modulator;
   direct a second portion of the input light having the second color towards the second spatial light modulator; and
   direct a third portion of the input light having the third color towards the second spatial light modulator.

15. The system of claim 12, wherein the first prism is a triangular prism having a first apex, the second prism is a triangular prism having a second apex, the third prism is a triangular prism having a third apex, the first apex adjacent the second apex and the third apex.

16. The system of claim 12, further comprising:
   a first layer on the second prism; and
   a second layer on the third prism.

17. The system of claim 16, wherein the first layer is a mirror and the second layer is a mirror.

18. The system of claim 16, wherein the first layer is a dichroic layer and the second layer is a dichroic layer.

* * * * *